US012763951B2

(12) United States Patent
Xie et al.

(10) Patent No.: US 12,763,951 B2
(45) Date of Patent: Oct. 13, 2026

(54) BLOCKCHAIN-BASED ANONYMOUS AUTHENTICATION METHOD FOR CROSS-TRUSTED AUTHORITY IN INTERNET OF VEHICLES

(71) Applicant: Hangzhou Normal University, Hangzhou (CN)

(72) Inventors: Qi Xie, Hangzhou (CN); Zhengyang Sun, Hangzhou (CN); Xiao Tan, Hangzhou (CN); Bin Hu, Hangzhou (CN); Yining Liu, Hangzhou (CN); Anjia Yang, Hangzhou (CN)

(73) Assignee: HANGZHOU NORMAL UNIVERSITY, Hangzhou (CN)

( * ) Notice: Subject to any disclaimer, the term of this patent is extended or adjusted under 35 U.S.C. 154(b) by 85 days.

(21) Appl. No.: 18/946,927

(22) Filed: Nov. 14, 2024

(65) Prior Publication Data

US 2026/0012346 A1 Jan. 8, 2026

(30) Foreign Application Priority Data

Jul. 5, 2024 (CN) ........................ 202410898656.3

(51) Int. Cl.
*H04L 9/32* (2006.01)
*H04L 9/00* (2022.01)

(52) U.S. Cl.
CPC ............ *H04L 9/321* (2013.01); *H04L 9/3231* (2013.01); *H04L 9/3247* (2013.01); *H04L 9/3278* (2013.01); *H04L 9/50* (2022.05)

(58) Field of Classification Search
CPC ....... H04L 9/083; H04L 9/321; H04L 9/3231; H04L 9/3247; H04L 9/3278; H04L 9/3239; H04L 9/50; H04L 2209/84
See application file for complete search history.

(56) References Cited

U.S. PATENT DOCUMENTS 10,936,552 B2 * 3/2021 Androulaki ........... H04L 9/0643
2009/0183008 A1 * 7/2009 Jobmann ................. G06F 21/34
235/382

(Continued)

FOREIGN PATENT DOCUMENTS

CN 110855670 A * 2/2020 ............. H04L 67/12
CN 112929179 B * 3/2022 ............. H04L 67/12

(Continued)

OTHER PUBLICATIONS

Wang et al., "A Blockchain-Based Multi-CA Cross-Domain Authentication Scheme in Decentralized Autonomous Network" [Online], Jun. 6, 2022[Retrieved on: Mar. 28, 2026],IEEE Trans. on Net. and Service Management V.19,Iss.3, Retrieved from: < https://ieeexplore.ieee.org/stamp/stamp.jsp?tp=&arnumber=9789481 > (Year: 2022).*

(Continued)

*Primary Examiner* — Eric W Shepperd

(57) ABSTRACT

The invention belongs to the field of computer security and discloses a blockchain-based anonymous authentication method for the Internet of Vehicles across trusted authorities, including registering the vehicle (with onboard unit) and roadside unit in their respective trusted authorities. When the vehicle enters different trusted authority domains, both the onboard unit and roadside unit generate corresponding authentication parameters and transmit them to the consortium blockchain of the Internet of Vehicles for verification and signature, obtaining authenticated data signed by the consortium blockchain. The onboard unit and roadside unit receive and verify the authenticated data, and upon successful verification, the onboard unit calculates a session key. The onboard unit uses the session key to sequentially transmit data with the roadside unit and the consortium blockchain. This technical solution allows vehicles from any trusted authority domain to authenticate and negotiate ses- (Continued)

sion keys with roadside units from different trusted authority domains.

5 Claims, 4 Drawing Sheets

(56) References Cited

U.S. PATENT DOCUMENTS

| | | | | |
|---|---|---|---|---|
| 2018/0109399 | A1* | 4/2018 | Cardoso de Moura | H04W 88/06 |
| 2021/0042869 | A1* | 2/2021 | Zheng | G06Q 50/26 |
| 2023/0113612 | A1* | 4/2023 | Zhou | G06F 7/588 713/189 |
| 2024/0235845 | A1* | 7/2024 | Zhao | H04L 9/32 |
| 2024/0275617 | A1* | 8/2024 | Lindskog | G06F 21/78 |

FOREIGN PATENT DOCUMENTS

| | | | | | |
|---|---|---|---|---|---|
| CN | 110446183 | B | * | 4/2022 | H04L 9/3268 |
| CN | 118611860 | A | * | 9/2024 | H04L 9/3297 |
| CN | 116260592 | B | * | 5/2025 | H04L 67/12 |
| CN | 116566581 | B | * | 10/2025 | H04L 9/0869 |
| CN | 121194175 | A | * | 12/2025 | |

OTHER PUBLICATIONS

Zhang et al., "Cross-domain Identity Authentication in IoV" [Online], Oct. 20, 2023[Retrieved on: Mar. 28, 2026], 23rd ICCT, Retrieved from: < https://ieeexplore.ieee.org/stamp/stamp.jsp?tp=&arnumber=10419648 > (Year: 2023).*

Liu et al., "Research on A Cross-Domain Authentication Scheme Based on Consortium Blockchain in V2G Networks of Smart Grid" [Online], Oct. 1, 2018 [Retrieved on: Mar. 28, 2026], IEEE EI2, Retrieved from: < https://ieeexplore.ieee.org/stamp/stamp.jsp?tp=&arnumber=8582227 > (Year: 2018).*

Yang et al., "A Blockchain-Based Multidomain Authentication Scheme for Conditional Privacy Preserving in Vehicular Ad-Hoc Network" [Online], Jun. 1, 2022[Retrieved on: Mar. 28, 2026], IoT Journalv9.i11, Retrieved from: < https://ieeexplore.ieee.org/stamp/stamp.jsp?tp=&arnumber=9521560 > (Year: 2022).*

* cited by examiner

| $RSU_j$ | $TA_j$ |
|---|---|
| | $TA_j$ choose unique identity $RID_j$ for $RSU_j$ |
| | Generate a random number $r_j$. |
| | $R_j = r_j \cdot P$ |
| | $sk_j = r_j + h\left(RID_j \parallel R_j \parallel pk_{TA_j}\right) \cdot sk_{TA_j}$ |
| | $\{RID_j, R_j, sk_j, pk_{TA_j}\}$ |
| Verify $sk_j \cdot P = R_j + h(ID_j \parallel R_j \parallel pk_{TA_j}) \cdot pk_{TA_j}$ | ← (secure channel) |
| If not, discard the message, otherwise a PUF challenge $cha_j$ is generated | |
| $res_j = PUF\left(cha_j\right)$ | |
| $K_j = res_j \oplus sk_j$ | |
| $pk_j = sk_j \cdot P$ | |
| $RSU_j$ stores $\{PUF(), ID_j, pk_{TA_j}, pk_j, K_j, R_j, cha_j\}$ | |

FIG. 2

| $V_i$ | $TA_i$ |
|---|---|
| $V_i$ choose its own identity $ID_i$. | |
| Generate a random number $x_i$. | |
| $X_i = h(x_i \Vert ID_i) \cdot P$ | |
| $\{ID_i, X_i\}$ → (secure channel) | |
| | Verify the validity and uniqueness of $ID_i$, if the verification passes |
| | Generate a random number $k_i$. |
| | $A_{V_i} = X_i + k_i \cdot P$ |
| | $\omega_i = k_i + h(ID_i \Vert A_{V_i} \Vert pk_{TA_i}) \cdot sk_{TA_i}$ |
| $sk_i = h(x_i \Vert ID_i) + \omega_i$ | $\{A_V, \omega_i, pk_{TA_i}\}$ ← (secure channel) |
| Verify $sk_i \cdot P = A_{V_i} + h(ID_i \Vert A_{V_i} \Vert pk_{TA_i}) \cdot pk_{TA_i}$ | |
| User enters biometric information $bio_i$, choose PUF challenge $cha_i$ | |
| $(\alpha_i, \beta_i) = Gen(bio_i)$, $res_i = PUF(cha_i)$ | |
| $B_V = h(ID_i \Vert \alpha_i \Vert res_i) \bmod n$ | |
| $C_V = E_{res_i}(ID_i \Vert sk_i \Vert A_V \Vert pk_i)$ | |
| OBU stores $\{B_V, C_V, \beta_i, pk_{TA_i}, cha_i\}$ | |

FIG. 3

| $V_i$ | $RSU_j$ | $SC_i$ |
|---|---|---|
| Input $bio_i^*$ and $ID_i^*$ | | |
| $\alpha_i = Rep(bio_i^*, \beta_i)$. | | |
| $res_i^* = PUF(cha_i)$ | | |
| $B_V^* = h(ID_i^* \| \alpha_i^* \| res_i^*)$ | | |
| If $B_V^* \neq B_V$, reject | | |
| $(ID_i \| sk_i \| A_{Vi} \| pk_i) = D_{res_i}(C_V)$ | | |
| Generate random number $m_i$, timestamp $t_1$ | $res_j = PUF(cha_j)$ | |
| $M_1 = m_i \cdot P$ | $sk_j = res_j \oplus K_j$ | |
| $d_i = sk_i + h(M_1) \cdot m_i$ | Generate random number $n_j$, timestamp $t_2$ | Verify $t_1, t_2$ |
| $M_2 = E_{h(m_i \cdot pk_{TA_i} \| t_1)}(ID_i \| A_{Vi} \| pk_i \| d_i)$ | $N_1 = n_j \cdot P$ | $(ID_i \| A_V \| pk_i \| d_i) = D_{h(M_1 \cdot sk_{TA_i} \| t_1)}(M_2)$ |
| $msg_1 = \{M_1, M_2, pk_{TA_i}, t_1\}$ | $f_j = sk_j + h(N_1) \cdot n_j$<br>$N_2 = E_{h(n_j \cdot pk_{TA_i} \| t_2)}(RID_j \| R_j \| pk_j \| f_j)$ | $(RID_j \| R_j \| pk_j \| f_j) = D_{h(N_1 \cdot sk_{TA_i} \| t_2)}(N_2)$ |
| (open channel)<br>⟶ | $msg_2 = \{msg_1, N_1, N_2, pk_{TA_i}, t_2\}$<br>⟶ | Verify $f_j \cdot P = R_j + h(ID_j \| R_j \| pk_{t1}) \cdot pk_{t1} + h(N_1) \cdot N_1$ |
| | (open channel) | Verify $d_i \cdot P = A_{Vi} + h(ID_i \| A_{Vi} \| pk_{t2}) \cdot pk_{t2} + h(M_1) \cdot M_1$ |
| | | Generate $t_3$ |
| | Verify $t_3$, generate $t_4$ | $M_3 = E_{h(N_1 \cdot sk_{TA_i} \| t_3)}(ID_i \| d_i \| N_1)$ |
| | $(RID_j \| f_j \| M_1) = D_{h(n_j \cdot pk_{TA_i} \| t_3)}(N_3)$ | $N_3 = E_{h(N_1 \cdot sk_{TA_i} \| t_3)}(RID_j \| f_j \| M_1)$ |
| Verify $t_4$ | $SK_j = h(n_j \cdot M_1 \| N_1 \| M_1)$ | $msg_3 = \{M_3, N_3, t_3\}$<br>⟵ |
| $(ID_i \| d_i \| N_1) = E_{h(m_i \cdot pk_{TA_i} \| t_3)}(M_3)$ | $N_4 = h(RID_j \| SK_j \| M_3 \| t_3 \| t_4)$ | (open channel) |
| $SK_i = h(m_i \cdot N_1 \| N_1 \| M_1)$ | $msg_4 = \{RID_j, M_3, N_4, t_3, t_4\}$ | |
| $N_4^* = h(RID_j \| SK_i \| M_3 \| t_3 \| t_4)$ | (open channel)<br>⟵ | |
| If $N_4^* \neq N_4$, reject | | |
| Key negotiation is complete, and V2I authentication is complete | | |

FIG. 4

BLOCKCHAIN-BASED ANONYMOUS AUTHENTICATION METHOD FOR CROSS-TRUSTED AUTHORITY IN INTERNET OF VEHICLES

TECHNICAL FIELD

The proposed invention relates to the field of computer security, particularly involving a blockchain-based anonymous authentication method for cross-trusted authority in Internet of Vehicle (IoV).

BACKGROUND

In recent years, with the continuous advancement of urbanization, the number of vehicles has sharply increased, thereby promoting the development of the Internet of Vehicles. The goal of IoV is to seamlessly integrate vehicles, environments, and individuals on roads to enhance traffic safety and efficiency. To ensure secure communication within IoV, identity authentication and key negotiation protocols play a crucial role. Secure and efficient protocols not only withstand various known attacks but also improve communication efficiency and reduce system overhead. Consortium blockchain, a variant of blockchain, emphasizes cooperation and collective management in its design. Its aim is to maintain decentralization while enhancing efficiency and control. Consortium blockchains provide a more flexible governance structure, enabling participants to collaborate more effectively. In specific business and industry use cases, consortium blockchains have become a blockchain solution that balances security, efficiency, and controllability.

SUMMARY

The purpose of the proposed invention is to provide a blockchain-based anonymous authentication method for cross-trusted authority in Internet of Vehicles, addressing the existing problems in prior technologies.

To achieve this purpose, the invention provides a blockchain-based anonymous authentication method for cross-trusted authority in Internet of Vehicle, Including:

Step 1: Initializing the system, where each trusted authority covers a trusted authority domain. A consortium blockchain of the Internet of Vehicle is constructed in each trusted authority domain with trusted authorities, roadside units, and onboard units as nodes.

Step 2: Registering the vehicles (with onboard units) and roadside units in their respective trusted authorities.

Step 3: When a vehicle enters a different trusted authority domain, both the onboard unit and the roadside unit generate corresponding authentication parameters and transmit them to the consortium blockchain of the Internet of Vehicle for signature verification, obtaining authenticated data signed by the consortium blockchain of the Internet of Vehicle.

Step 4: The onboard unit and the roadside unit receive and verify the authenticated data. Upon successful verification, the onboard unit calculates a session key.

Step 5: The onboard unit uses the session key to sequentially transmit data with the roadside unit and the consortium blockchain of the Internet of Vehicle.

The process of registering the roadside unit in the trusted authority involves:

The roadside unit sends a registration request to the trusted authority. Upon receiving the request, the trusted authority generates registration data for the roadside unit, including unique identity data and the roadside unit's private key. This data is securely transmitted to the roadside unit through a secure channel. Upon receiving the registration data, the roadside unit verifies its validity. If verification is successful, the unit protects and stores its secret parameters based on a physical unclonable function (PUF), completing the registration.

The process of registering the vehicle (with onboard unit) in the trusted authority involves:

The onboard unit sends its registration data, including identity data and a first random number, to the trusted authority via a secure channel. The trusted authority verifies the identity, generates verification data comprising a second random number and trusted authority signature data, and sends it back to the onboard unit for validity verification through a secure channel. Upon successful verification, the onboard unit protects and stores the verification data and its secret parameters based on biometric keys, completing the registration.

Step 3 involves:

The user verifies their identity to log into the onboard unit and retrieve stored secret parameters. Using these parameters, the onboard unit computes authentication parameters. The roadside unit receives these parameters from the onboard unit and computes its corresponding authentication parameters. Both sets of authentication parameters are sent to the consortium blockchain of the Internet of Vehicles via smart contract invocation. The consortium blockchain verifies and signs the authentication parameters, producing authenticated data.

Step 4 involves:

The roadside unit receives the authenticated data, performs timestamp and parameters verification, and sends the authenticated data to the onboard unit upon successful verification. The onboard unit verifies timestamp and the authenticated data received from the roadside unit subsequently computing the session key.

The technical effects of the invention are as follows:

The invention leverages the admission mechanism and smart contracts of consortium blockchains to enable vehicles from any trusted authority domain to authenticate and negotiate session keys with roadside units from different trusted authority domains. In this invention, roadside units from different trusted authority domains can authenticate and negotiate session keys with vehicles registered in any trusted authority domain through blockchain. The use of consortium blockchains enhances blockchain throughput, combined with an access control mechanism where only roadside units registered through trusted authorities are allowed blockchain access, ensuring the security of privacy data on the blockchain.

The invention emphasizes privacy protection for vehicles, ensuring that vehicles do not expose their real identities during interactions with other entities.

The invention integrates physical unclonable functions and biometric key features into roadside units (RSUs) and onboard unit (OBU) to defend against roadside unit capture attacks and OBU intrusion attacks.

The invention employs elliptic curve cryptography, known for their advantages such as short keys, high strength, few parameters, fast digital signatures, and small computational data volume, making them particularly suitable for devices with limited computing and storage resources.

BRIEF DESCRIPTION OF DRAWINGS

To better illustrate the technical solutions in the embodiments of the proposed invention or the prior art, a brief introduction will be given to the drawings required for the embodiments. It is apparent that the drawings described below are merely some embodiments of the proposed invention, and those skilled in the art may obtain other drawings based on these drawings without undue creativity. The drawings forming part of this application are used to provide further understanding of this application. Exemplary embodiments and their descriptions are used to explain this application and do not constitute improper limitations on this application. In the drawings:

FIG. 2 is a roadside unit registration process;

FIG. 3 is a vehicle unit registration process;

FIG. 4 is a flow chart of mutual authentication and negotiation of session keys between vehicles and RSUs

DETAILED DESCRIPTION OF EMBODIMENTS

Figure 1:
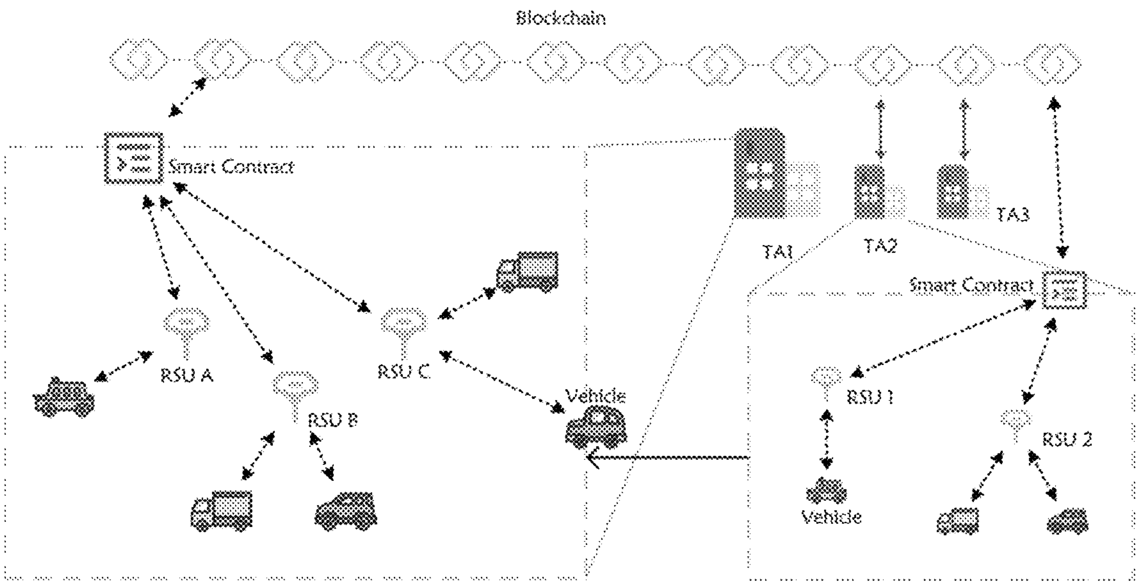
FIG. 1 depicts a system model of vehicles, roadside units, and blockchain in an embodiment of the proposed invention.

The following provides various illustrative embodiments of the proposed invention in detail. This detailed description should not be construed as limiting the proposed invention, but rather as a more detailed description of certain aspects, features, and implementations of the proposed invention.

The terms used in the proposed invention should be understood as being used to describe particular embodiments, and not to limit the proposed invention. Additionally, with regard to numerical ranges disclosed herein, it should be understood that every intermediate value between the upper and lower limits of the range is also specifically disclosed. Any smaller ranges within the stated value or within the range also fall within the scope of the proposed invention. The upper and lower limits of these smaller ranges may independently be included or excluded from the range.

Unless otherwise specified, all technical and scientific terms used in this document have the same meaning as commonly understood by one of ordinary skill in the art to which this invention belongs. While preferred methods have been described herein, other methods similar or equivalent to those described may be used in the practice or testing of the present invention. All references mentioned in this specification are incorporated by reference to disclose and describe methods related to the referenced documents. In the event of conflict with any incorporated document, the content of this specification shall prevail.

Various modifications and variations can be made to specific embodiments of the proposed invention described in this specification without departing from the scope or spirit of the invention, which will be apparent to those skilled in the art. Other embodiments derived from the description of the proposed invention are apparent to those skilled in the art. This application and examples are exemplary.

Regarding the terms "comprising," "including," "having," "containing," and similar terms used herein, they are open-ended terms, meaning they encompass but are not limited to.

It should be noted that, unless conflicting, features of embodiments in this application and features in other embodiments can be combined. The following detailed description will reference the drawings and combine with embodiments to explain this application in detail.

Embodiment 1

As shown in FIG. 1, this embodiment provides a blockchain-based anonymous authentication method for cross-trusted authority in Internet of Vehicle networks. The method includes:

Step 1: Initializing the system, where each trusted authority covers a domain. A consortium blockchain of the Internet of Vehicles is constructed with trusted authorities, roadside units, and onboard units as nodes within their respective coverage areas. Step 2: Registering the onboard units and roadside units in their corresponding trusted authorities. Step 3: When a vehicle (with onboard unit) enters a different trusted authority domain, generating authentication parameters and transmitting them to the consortium blockchain for verification and signature, resulting in authenticated data signed by the consortium blockchain. Step 4: Verifying the received authenticated data by the onboard units and roadside units. Upon successful verification, the onboard unit computes a session key. Step 5: Using the session key, the onboard unit sequentially transfers data with the roadside units and the consortium blockchain.

This embodiment discloses a blockchain-based anonymous authentication protocol for cross- trusted authority in Internet of Vehicle. It addresses the challenges of cross-domain vehicle authentication and the security risks of shared public-private key pairs in multi-trusted authority models within the current Internet of Vehicle scenarios. The protocol leverages consortium blockchain's admission mechanisms and smart contracts to enable vehicles from any trusted authority domain to authenticate and negotiate session keys with roadside units from different trusted authority domains without direct involvement of the trusted authorities. Additionally, vehicles can utilize their sensors to collect traffic information and upload it to the blockchain through roadside units using session keys. Cryptographic tools ensure confidentiality, integrity, and validity of messages during authentication and key negotiation processes, effectively resisting various known attacks.

This embodiment presents a blockchain-based anonymous authentication protocol for Internet of Vehicle that spans trusted authority domains. Vehicles undergo identity verification and session key negotiation through local roadside units upon entering different trusted authority domains. Vehicles from any trusted authority domain can authenticate and negotiate session keys with roadside units from different trusted authority domains without direct involvement with the trusted authorities. Vehicles utilize their sensors to collect traffic information and upload collected data to the blockchain through roadside units using session keys.

This embodiment involves three entities: vehicles, roadside units, and a consortium blockchain. Storage units in the vehicles and roadside units store information, and both entities are initially registered in the trusted authority. The trusted authorities act as organizing nodes in the blockchain, forming an organizer group using the RAFT consensus algorithm. All trusted authorities collectively manage blockchain transactions such as identity verification requests, traffic data reception, and block generation based on the consensus mechanism. Additionally, smart contracts are deployed on the consortium blockchain, initialized during blockchain setup by trusted authorities from different regions.

Upon entering different trusted authority domains, vehicles undergo identity verification and session key negotiation through local roadside units. Vehicles from any trusted authority domain can authenticate and negotiate session keys with roadside units from different trusted authority domains without direct involvement with the trusted authorities. Vehicles utilize their sensors to collect traffic information and use session keys to upload collected data through roadside units to the blockchain.

The trusted authority generates a unique identity for the roadside unit, utilizing random numbers and the trusted authority's private key to generate the private key of the roadside unit. The corresponding parameters are securely transmitted to the roadside unit through a secure channel. Upon receiving the message, the roadside unit verifies the validity of authentication parameters, protects secret information using a physical unclonable function, and finally stores the processed information in its memory.

Vehicles select their identities and generate random numbers to send to the trusted authority. Upon receiving the message, the trusted authority first verifies the legality and uniqueness of the message. Subsequently, the trusted authority uses its private key to generate a signature and transmits the signature and relevant parameters to the vehicle through a secure channel. Upon receiving the parameters, the vehicle first verifies the validity of the signature, then protects secret parameters using a biometric key, and stores the processed parameters in the onboard unit.

During the identity authentication between vehicle and RSU, the vehicle first inputs its biometric information to recover the secret parameters stored in the onboard unit. The vehicle sends the processed authentication parameters to the roadside unit, which transfers the authentication parameters of the vehicle and itself to the consortium blockchain by invoking smart contracts. The blockchain verifies the authentication information provided by the vehicle and roadside unit. Upon successful verification, it returns authenticated messages signed by the blockchain. The roadside unit retains some authentication messages and forwards the rest to the vehicle. The vehicle and roadside unit verify the blockchain's signature, allowing them to compute a session key upon successful verification.

The trusted authority acts as an organizing node in the blockchain, forming an organizer group using a consensus algorithm. All trusted authorities jointly manage blockchain transactions such as identity verification requests, traffic data reception, and block generation based on the consensus mechanism. Additionally, smart contracts are deployed on the consortium blockchain, crucial components of the system model. These smart contracts are deployed independently by trusted authorities from different regions during the blockchain initialization process. Each region's trusted authority embeds its private key into smart contracts secretly, enabling them to autonomously execute identity authentication and message signing between vehicle and roadside unit.

The purpose of this embodiment is to provide a blockchain-based anonymous authentication protocol for Internet of Vehicle across trusted authorities. To address the current challenges in IoV scenarios regarding cross-domain vehicle authentication and the security risks of multiple trusted authorities sharing the same public-private key pair, the protocol leverages consortium blockchain's admission mechanisms and smart contracts. This enables vehicles from any trusted authority domain to authenticate with and negotiate session keys with roadside units from different trusted authority domains.

Each trusted authority possesses independent public and private key pairs, with each authority responsible for registering local roadside units and vehicles within its domain. Roadside units from different trusted authority domains can authenticate and negotiate session keys with vehicles registered in any trusted authority domain via the blockchain.

The consortium blockchain enhances throughput and integrates access control mechanisms, allowing only trusted authority-registered roadside units access to the blockchain, thereby ensuring the security of privacy data on the blockchain.

Emphasis is placed on preserving vehicle privacy, ensuring vehicles do not expose their true identities during interactions with other entities.

Physical unclonable functions and biometric key integration into roadside units and OBUs defend against roadside unit capture attacks and OBU intrusion attacks.

Elliptic curve cryptography is employed for its advantages such as short key length, high strength, minimal parameters, fast digital signatures, and low computational and storage requirements, making it particularly suitable for devices with limited computing and storage resources.

Table 1 shows the symbols used in the protocol and their descriptions.

TABLE 1 symbols used in the protocol and their descriptions

| Symbol | Description |
|---|---|
| $TA_n$ | The nth trusted authority |
| $SC_n$ | Smart contracts deployed by the nth trusted authority |
| $V_i$ | The i-th vehicle |
| $RSU_j$ | The j-th RSU |
| $ID_i$ | Unique identity of $V_i$ |
| $bio_i$ | User's biometric information |
| $RID_j$ | Unique identity of $RSU_j$ |
| $sk_{TA_n}$, $pk_{TA_n}$ | Private and public keys of $TA_n$ |
| $sk_j$, $pk_j$ | Private and public keys of $RSU_j$ |
| $sk_i$, $pk_i$ | Private and public keys of $V_i$ |
| $SK_i$, $SK_j$ | Session between $V_i$ and $RSU_j$ |
| $cha_j$, $res_j$ | Challenges and responses of PUF (.) |
| Rep(.), Gen(.) | Regeneration and generation functions of fuzzy extractors |
| $\alpha_i$, $\beta_i$ | Biometric key and reproduction parameters |
| $t_1$, $t_2$, $t_3$, $t_4$ | Timestamp |
| h(.) | Hash function |
| $\|$ | Connector |
| $\oplus$ | Xor operation |
| P | Base point of an elliptic curve |
| $\Delta t$ | Transmission delay time |

The specific implementation steps of this plan include the following steps:

S1. All TA choose an elliptic curve $E(GF_q)$ and a base point P. Based on this elliptic curve, each $TA_n$ choose their own private key $sk_{TA_n}$ and calculate the corresponding public key $pk_{TA_n}=SK_{TA_n}\cdot P$. All TA deploy their own smart contracts $SC_n$ on the blockchain, and secretly embed their own private key in the smart contract. In addition, all TA chooses biometric information generation algorithms $Gen(\cdot)$, recovery algorithm $Rep(\cdot)$ and a one-way hash function $h(\cdot)$. Finally, $TA_n$ securely stores $sk_{TA_n}$ and make $pk_{TA_n}$ and system parameters $\{q, P, Gen(\cdot), Rep(\cdot), h(\cdot)\}$ public on the blockchain.

S2. The vehicle and the roadside unit submit the registration request to the trusted center, and the trusted center will feedback the registration information to the vehicle and the roadside unit, and store the registration information of the vehicle and the roadside unit in the vehicle's OBU and the storage unit of the roadside unit respectively, specifically:

$TA_j$ choose unique identity $RID_j$ for $RSU_j$, and generate a random number $r_j$, computes $R_j=r_j\cdot P$, $sk_j=r_j+h(RID_j\|R_j\|pk_{TA_j})\cdot sk_{TA_j}$, where $pk_{TA_j}$ and $sk_{TA_j}$ are the public and private keys of $TA_j$. The $TA_j$ sends $\{R_j, sk_j\}$ to RSU; via secure channel;

S2.2 After receiving the message, $RSU_j$ verify $sk_j\cdot P=R_j+h(RID_j\|R_j\|pk_{TA_j})\cdot pk_{TA_j}$. If not, discard the message, otherwise, $RSU_j$ generate PUF challenge $cha_j$ and compute $res_j=PUF(cha_j)$, $K_j=res_j\oplus sk_j$, $pk_j=sk_j\cdot P$. Then $RSU_j$ stores $\{PUF(\cdot), ID_j, pk_{TA_j}, pk_j, K_j, R_j, cha_j\}$. FIG. 2 depicts this process;

S2.3 As shown in FIG. 3, the process of vehicle registration is as follows:

$V_i$ choose $ID_i$ and generate a random number $x_i$ and computes $X_i=h(x_i\|ID_i)\cdot P$. $V_i$ sends $\{ID_i, X_i\}$ to $TA_i$ via secure channel;

S2.4 After receiving the message, $TA_i$ verifies the legitimacy and uniqueness of the identity, and generates a random number $k_i$ after passing the verification, computes $A_{Vi}=X_i+k_i\cdot P$, $\omega_i=k_i+h(ID_i\|A_{Vi}\|pk_{TA_i})\cdot sk_{TA_i}$. $TA_i$ sends $\{A_{Vi}, \omega_i\}$ to $V_i$ via secure channel;

S2.5 After receiving the message, $V_i$ calculates its own private key and corresponding public key $sk_i=h(x_i\|ID_i)+\omega_i$, $pk_i=sk_i\cdot P$. Then $V_i$ verify equation $pk_i=A_{Vi}+h(ID_i\|A_{Vi}\|pk_{TA_i})\cdot pk_{TA_i}$. If not, discard the information, otherwise the user enters the biometric information $bio_i$, and computes $(\alpha_i, \beta_i)=Gen(bio_i)$, select the PUF challenge $cha_i$, and computes $res_i=PUF(cha_i)$, $B_V=h(ID_i\|\alpha_i\|res_i)$, $C_V=E_{res_i}(ID_i\|sk_i\|A_V\|pk_i)$. Then $V_i$ stores $\{Rep(\cdot), B_V, C_V, \beta_i, pk_{TA_i}, cha_i\}$ in OBU.

S3. When entering a different TA domain, the vehicle authenticates the local RSU each other and negotiates the session key. Vehicles from any TA domain can authenticate and negotiate session keys with RSUs of different TA domains without directly participating with TA. FIG. 4 shows the process of mutual authentication and negotiation of session keys between vehicles and roadside units.

S3.1 User inputs biometric information $bio_i^*$ and identity $ID_i^*$ in OBU. OBU computes $\alpha_i^*=Rep(bio_i^*, \beta_i)$, $res_i^*=PUF(cha_i)$, $B_V^*=h(ID_i^*\|\alpha_i^*\|res_i^*)$. If $B_V^*\neq B_V$, OBU rejects the login request, otherwise computes $(ID_i\|sk_i\|A_{Vi}\|pk_i)=D_{res_i}(C_V)$ to recover $\{ID_i, sk_i, A_{Vi}, pk_i\}$;

S3.2 When the vehicle $V_i$ enters the domain of $RSU_j$, it automatically communicates with $RSU_j$. $V_i$ generates random number $m_i$ and timestamp $t_1$, and computes $M_1=m_i\cdot P$, $d_i=sk_i+h(M_1)\cdot m_i$, $$M_2=E_{h\left(m_i\cdot pk_{TA_i}\|t_1\right)}(ID_i\|A_{Vi}\|pk_i\|d_i).$$

Then $V_i$ sends $msg_1=\{M_1, M_2, pk_{TA_i}, t_1\}$ to $RSU_j$ via an open channel;

S3.3 After receiving the message, RSU; recovers its own private key $sk_j$ with a unclonable function. The process is as follows: $res_j=PUF(cha_j)$, $sk_j=res_j\oplus K_j$. Then $RSU_j$ generates random number $n_i$ and timestamp $t_2$, and computes $N_1=n_j\cdot P$, $pk_j=sk_j\cdot P$, $f_j=sk_j+h(N_1)\cdot n_j$, $$N_2=E_{h\left(n_j\cdot pk_{TA_i}\|t_2\right)}(RID_j\|R_j\|pk_j\|f_j).$$

$RSU_j$ uses $msg_2=\{msg_1, N_1, N_2, pK_{TA_j}, t_2\}$ as parameters to invoke smart contract $TA_i$ deployed on the blockchain;

S3.4 The smart contract first verifies the freshness of timestamps $t_1$, $t_2$, computes $$(ID_i\|A_V\|pk_i\|d_i).=D_{h\left(M_1\cdot sk_{TA_i}\|t_1\right)}(M_2),$$

$$(RID_j\|R_j\|pk_j\|f_j).=D_{h\left(N_1\cdot sk_{TA_i}\|t_1\right)}(N_2).$$

And then verifies the equation $f_j\cdot P=R_j+h(RID_j\|R_j\|pk_{TA_j})\cdot pk_{TA_j}+h(N_1)\cdot N_1$. If the equation is true, the smart contract verifies the equation $d_i\cdot P=A_{Vi}+h(ID_i\, f A_{Vi}\|pk_{TA_i})\cdot pk_{TA_i}+h(M_1)\cdot M_1$. If the equation does not hold, the smart contract terminates the request, otherwise a timestamp $t_3$ will be generated, and computes $$M_3=E_{h\left(M_1\cdot sk_{TA_i}\|t_3\right)}(ID_i\|d_i\|N_1),\ N_3=E_{h\left(N_1\cdot sk_{TA_i}\|t_3\right)}(RID_j\|f_j\|M_1).$$

The smart contract returns parameter $msg_3=\{M_3, N_3, t_3\}$ to $RSU_j$;

S3.5 After receiving the parameters returned by the smart contract, the freshness of the timestamp $t_3$ is first verified and then the timestamp $t_4$ is generated, then computes $$(RID_j\|f_j\|M_1)=D_{h\left(n_j\cdot pk_{TA_i}\|t_3\right)}(N_3).$$

$RSU_j$ verifies if $\{RID_j, f_j\}$ is the same as the data calculated by itself. If the verification is passed, then calculate $SK_j=h(n_j\cdot M_1\|N_1\|M_1)$, $N_4=h(RID_j\|SK_j\|M_3\|t_3\|t_4)$. $SK_j$ represents the session key negotiated between $RSU_j$ and $V_i$. $RSU_j$ sends message $msg_4=\{RID_j, M_3, N_4, t_3, t_4\}$ to $V_i$ through an open channel;

S3.6 After receiving the message, $V_i$ first verifies the freshness of the timestamp $t_4$ and calculates $$(ID_i\|d_i\|N_1)=E_{h_{h\left(m_1\cdot pk_{TA_i}\|t_3\right)}}(M_3).$$

Then verifies whether $\{ID_i, d_i\}$ are the same as the data calculated by itself. If the verification is passed, then calculates $SK_i=h(m_i\cdot N_1\|N_1\|M_1)$, $N_4^*=h(RID_j\|SK_i\|M_3\|t_3\|t_4)$. $V_i$ verifies if $N_4^*=N_4$ is equal, if it is true, the key negotiation is completed and the authentication is completed.

The messages $msg_1$, $msg_2$, $msg_3$ and $msg_4$ are all transmitted within the public channel.

The above is only the preferred specific implementation method of the present application, but the scope of protection of the present application is not limited to this. Any changes or replacements that can be easily thought of by technical personnel familiar with the technical field within the scope of disclosure of the present application should be covered within the scope of protection of the present application. Therefore, the scope of protection of this application should be based on the scope of protection of the claims.

What is claimed is:

1. A blockchain-based anonymous authentication method for cross-trusted authority in Internet of Vehicles, comprising the following steps:

step 1: initializing a system to include a plurality of trusted authorities, wherein each trusted authority covers a trusted authority domain of a plurality of trusted authority domains, possesses independent public and private key pairs, and embeds a private key thereof into a smart contract, and a consortium blockchain of the Internet of Vehicles is constructed in each trusted authority domain with trusted authorities, roadside units, and onboard units of vehicles as nodes;

step 2: registering the onboard units of vehicles and the roadside units in respective trusted authorities;

step 3: when a vehicle enters a trusted authority domain, generating, by an onboard unit of the vehicle a roadside unit of the entered trusted authority domain, corresponding authentication parameters; and transmitting, by the roadside unit, the authentication parameters to the consortium blockchain of the Internet of Vehicles for signature verification, to obtain authenticated data signed by the consortium blockchain of the Internet of Vehicles;

step 4: receiving and verifying, by the onboard unit and the roadside unit, the authenticated data, and upon successful verification, calculating, by the onboard unit, a session key; and step 5: transmitting, by the onboard unit, data to the roadside unit and the consortium blockchain of the Internet of Vehicles sequentially by using the session key;

wherein the step 3 specifically comprises:

verifying, by a user, an identity of the user to log into the onboard unit and retrieve stored secret parameters;

computing, by the onboard unit, a first set of authentication parameters by using the secret parameters;

receiving, by the roadside unit, the first set of authentication parameters from the onboard unit;

computing, by the roadside unit, a corresponding second set of authentication parameters;

sending, by the roadside unit, both the first and second sets of authentication parameters to the consortium blockchain of the Internet of Vehicles via smart contract invocation; and verifying and signing, by the smart contract, the first and second sets of authentication parameters, thereby producing the authenticated data.

2. The blockchain-based anonymous authentication method for cross-trusted authority in Internet of Vehicles according to claim 1, wherein the step 2 comprises the following steps:

sending, by a respective roadside unit, a registration request to a respective trusted authority;

upon receiving the registration request, generating, by the respective trusted authority, registration data for the respective roadside unit, wherein the registration data for the respective roadside unit comprises unique identity data and a private key of the respective roadside unit;

securely transmitting the registration data to the respective roadside unit through a secure channel;

upon receiving the registration data, verifying, by the respective roadside unit, validity of the registration data; and when verification succeeds, protecting and storing, by the respective roadside unit, secret parameters of the roadside unit based on a physical unclonable function, thereby completing registration of the respective roadside unit.

3. The blockchain-based anonymous authentication method for cross-trusted authority in Internet of Vehicles according to claim 1, wherein the step 2 comprises the following steps:

sending, by a respective onboard unit, registration data of the respective onboard unit, including identity data and a first random number, to a respective trusted authority via a secure channel; verifying, by the respective trusted authority, the identity data; generating, by the respective trusted authority, verification data comprising a second random number and trusted authority signature data; it and sending the verification data back to the respective onboard unit for validity verification through a secure channel; and upon successful verification, protecting and storing, by the respective onboard unit, the verification data and secret parameters of the respective onboard unit based on biometric keys, thereby completing registration of the respective onboard unit.

4. The blockchain-based anonymous authentication method for cross-trusted authority in Internet of Vehicles according to claim 1, wherein during the step 3, the onboard unit does not directly transmit any authentication parameter to the consortium blockchain, and all authentication parameters are transmitted to the consortium blockchain solely by the roadside unit.

5. The blockchain-based anonymous authentication method for cross-trusted authority in Internet of Vehicles according to claim 1, wherein the step 4 comprises the following steps:

receiving, by the roadside unit, the authenticated data; performing, by the roadside unit, timestamp and parameters verification on the authenticated data; sending, by the roadside unit, the authenticated data to the onboard unit upon successful verification; verifying, by the onboard unit, the timestamp and the authenticated data received from the roadside unit; and subsequently computing the session key.

* * * * *